United States Patent
Kim et al.

(10) Patent No.: US 9,261,532 B1
(45) Date of Patent: Feb. 16, 2016

(54) CONDUCTIVE ATOMIC FORCE MICROSCOPE AND METHOD OF OPERATING THE SAME

(71) Applicant: Samsung Electronics Co., Ltd., Suwon-si, Gyeonggi-do (KR)

(72) Inventors: Hyun-woo Kim, Chungju-si (KR); Woo-seok Ko, Seoul (KR); Young-hwan Kim, Seoul (KR); Jeong-hoi Kim, Suwon-si (KR); Baek-man Sung, Seoul (KR); Hyung-su Son, Hwaseong-si (KR); Chae-ho Shin, Hwaseong-si (KR); Yu-sin Yang, Seoul (KR); Jae-youn Wi, Suwon-si (KR); Sang-kil Lee, Yongin-si (KR); Chung-sam Jun, Suwon-si (KR)

(73) Assignee: SAMSUNG ELECTRONICS CO., LTD., Gyeonggi-Do (KR)

(*) Notice: Subject to any disclaimer, the term of this patent is extended or adjusted under 35 U.S.C. 154(b) by 0 days.

(21) Appl. No.: 14/694,115

(22) Filed: Apr. 23, 2015

(30) Foreign Application Priority Data

Jul. 31, 2014  (KR) .......................... 10-2014-0098636

(51) Int. Cl.
*G01Q 60/40* (2010.01)

(52) U.S. Cl.
CPC ...................... *G01Q 60/40* (2013.01)

(58) Field of Classification Search
CPC ..................................................... G01Q 60/40
USPC ........................................ 850/33, 36, 40, 41
See application file for complete search history.

(56) References Cited

U.S. PATENT DOCUMENTS

| 7,757,544 B2 | 7/2010 | Huang et al. |
| 8,161,805 B2 | 4/2012 | Su et al. |
| 8,438,660 B2 | 5/2013 | Hirooka et al. |

(Continued)

FOREIGN PATENT DOCUMENTS

| JP | 2001-185593 A | 7/2001 |
| JP | 2004-170281 A | 6/2004 |

(Continued)

OTHER PUBLICATIONS

C. Shin, "Fast, Exact, and Non-Destructive Diagnoses of Contact Failures in Nano-Scale Semiconductor Device Using Conductive AFM", Scientific Reports | 3 : 2088 | DOI: 10.1038/srep02088, Jun. 28, 2013, 6 pages.

*Primary Examiner* — Michael Maskell
(74) *Attorney, Agent, or Firm* — Harness, Dickey & Pierce, P.L.C.

(57) ABSTRACT

A conductive atomic force microscope including a plurality of probe structures each including a probe and a cantilever connected thereto, a power supplier applying a bias voltage, a current detector detecting a first current flowing between a sample object and each of the probes and a second current flowing between a measurement object and each of the probes, and calculating representative currents for the sample and measurement objects based on the first and second currents, respectively, and a controller calculating a ratio between representative currents of the sample object measured by each of the probe structures, calculating a scaling factor for scaling the representative current with respect to the measurement object measured by each of the probes, and determine a reproducible current measurement value based on the second measurement current and the scaling factor may be provided.

20 Claims, 8 Drawing Sheets

(56) References Cited

U.S. PATENT DOCUMENTS

| | | |
|---|---|---|
| 2008/0277582 A1 | 11/2008 | Shi et al. |
| 2010/0306886 A1 | 12/2010 | Harada et al. |
| 2012/0030846 A1 | 2/2012 | Sathish et al. |
| 2014/0068822 A1 | 3/2014 | Eyben et al. |

FOREIGN PATENT DOCUMENTS

| | | |
|---|---|---|
| JP | 2010-276488 A | 12/2010 |
| JP | 2012-013575 A | 1/2012 |
| JP | 4934571 B2 | 5/2012 |
| JP | 5452088 B2 | 3/2014 |
| KR | 10-1041916 B1 | 6/2011 |

CONDUCTIVE ATOMIC FORCE MICROSCOPE AND METHOD OF OPERATING THE SAME

CROSS-REFERENCE TO RELATED APPLICATION

This application claims priority under 35 U.S.C. §119 to Korean Patent Application No. 10-2014-0098636, filed on Jul. 31, 2014, in the Korean Intellectual Property Office, the disclosure of which is incorporated herein in its entirety by reference.

BACKGROUND

The inventive concepts relate to a conductive atomic force microscopes and methods of operating the same, and more particularly, to systems for scaling measured currents of an object measured by different probes of a conductive atomic force microscope including probes and/or methods of operating the same.

A conductive atomic force microscope (c-AFM) is a microscope that is configured to measure conductance and resistance of an object (hereinafter, referred to as measurement object) at a spatial resolution of tens of nanometers by applying a bias voltage to the measurement object and measuring a current flowing between a probe and the measurement object. In order to measure a current by using a conductive atomic force microscope, a probe coated with a conductive material may contact with the measurement object to form a current path therebetween. The resistance and conductance distribution of the measurement object may be measured by measuring a current flowing through the probe at each position by moving the measurement object and/or the probe.

In the conductive atomic force microscope using the probe, the contact resistance between the probe and the measurement object may affect the measurement result. To ensure the reliable and reproducible measurements, uniform maintenance of the contact resistance between the probe and the measurement object is desired.

SUMMARY

Some of the inventive concepts provide conductive atomic force microscopes and methods of operating the same, which monitors a current of a measurement object using a probe and, when different currents are measured by probes, scales the different currents.

According to an example embodiment, a conductive atomic force microscope includes a plurality of probe structures, each of which including a probe and a cantilever connected thereto, a power supply unit configured to apply a bias voltage to each of a sample object and a measurement object, a current detecting unit configured to detect a first current flowing between the sample object and each of the plurality of probe structures, detect a second current flowing between the measurement object and each of the plurality of probe structures, and calculate representative currents with respect to the sample object and the measurement object based on the first and second currents, respectively, and a control unit configured to calculate a ratio between representative currents of the sample object measured by each of the plurality of probe structures, calculate a scaling factor for scaling a representative current of the measurement object measured by each of the plurality of probe structures, and determine a reproducible current measurement value based on the second current and the scaling factor.

According to some example embodiments, when a resistance of the sample object is equal to a resistance of the measurement object, the control unit may be configured to calculate the scaling factor as the ratio between the representative currents of the sample object.

According to some example embodiments, the conductive atomic force microscope may further include a scanning unit configured to raster-scan at least one of the sample object and the measurement object on a pixel-by-pixel basis.

According to some example embodiments, the scanning unit may include an actuator configured to move, on a pixel-by-pixel basis, the probe in a first direction and a second direction perpendicular to the first direction.

According to some example embodiments, the current detecting unit may be configured to calculate the representative current by (1) adding up currents measured by the probe on a pixel-by-pixel basis and (2) dividing the resulting sum by a number of pixels.

According to some example embodiments, the conductive atomic force microscope may further include a display unit configured to display the representative current of any one of the sample object and the measurement object.

According to some example embodiments, the current detecting unit may include a current monitoring unit configured to check whether representative currents measured at the measurement object are uniform.

According to some example embodiments, the control unit may include a memory unit configured to store the representative current of each of the sample object and the measurement object measured by each of the plurality of probe structures.

According to an example embodiment, a method of operating a conductive atomic force microscope includes selecting a first probe as a measurement probe, applying a bias voltage to a sample object and measuring a first current image using the first probe, calculating a first representative current based on the first current image using a current detecting unit, applying a bias voltage to a measurement object and measuring a first measured current using the first probe, selecting a second probe as a measurement probe, applying a bias voltage to the sample object and measuring a second current image using the second probe, calculating a second representative current based on the second current image of the sample object using the current detecting unit, applying a bias voltage to the measurement object and measuring a second measured current using the second probe, calculating a scaling factor by feeding back the first representative current and the applied first and second bias voltages and dividing the second representative current by the first representative current, and determining a reproducible current measurement value based on the first and second measured currents and the scaling factor.

According to some example embodiments, the method may further include measuring the conductance and resistance of the measurement object based on the scaling factor.

According to some example embodiments, the calculating a scaling factor may be performed for a range, in which the current measured by each of the first probe and the second probe is linear with respect to the bias voltages.

According to some example embodiments, the method may further include calculating a resistance of the sample object by dividing the bias voltage applied to the sample object by the second representative current, and calculating a resistance of the measurement object by dividing the bias voltage applied to the measurement object by the second measured current, wherein when the resistance of the sample object is different from a resistance of the measurement object, the calculating a scaling factor is performed by adding a value, which is obtained by dividing the bias voltage applied to the sample object by the first representative current, to a difference between the resistance of the measurement object and the resistance of the sample object, and dividing the resulting sum by a value obtained by adding a value, which is obtained by dividing the bias voltage applied to the sample object by the second representative current, to the difference between the resistance of the measurement object and the resistance of the sample object.

According to some example embodiments, the method of claim may further include displaying the first measured current and the second measured current on a display unit.

According to some example embodiments, the calculating the first current image and the second current image may be performed by scanning the sample object on a pixel-by-pixel basis using the first probe and the second probe.

According to some example embodiments, the calculating each of the first representative current and the second representative current may be performed by adding up current image values measured by scanning the sample object on a pixel-by-pixel basis and dividing the resulting sum by a number of pixels.

According to an example embodiment, a conductive atomic force microscope includes a power supply configured to apply a first bias voltage to a sample object and a second bias voltage to a measurement object, a plurality of probe structures configured to measure a first sample current flowing through the sample object and one of the plurality of probe structures, measure a second sample current flowing through the sample object and another of the plurality of probe structure, measure a first measurement current flowing between a measurement object and one of the plurality of probe structures, and measure a second measurement current flowing between a measurement object and another of the plurality of probe structures, a current detector configured to calculate a first representative current and a second representative current based on the first sample current and the second sample current, respectively, and a controller configured to calculate a scaling factor for the second measured current, and determine a reproducible current measurement value based on the second measured current and the scaling factor.

According to some example embodiments, when a resistance of the sample object is equal to a resistance of the measurement object, the controller may be configured to calculate the scaling factor for the second measurement current as a ratio between the first and second representative currents of the sample object.

According to some example embodiments, when a resistance of the sample object and a resistance of the measurement object are different from each other, the controller may be configured to calculate the scaling factor for the second measurement current based on the first and second bias voltages, the first representative current, the second representative current, and the second measured current.

According to some example embodiments, the current detector may be further configured to track a change trend of the first and second representative currents according to states of the plurality of probes by checking whether the first and second representative currents are uniform.

According to some example embodiments, the conductive atomic force microscope may further include a scanner configured to raster-scan the sample object and the measurement object on a pixel-by-pixel basis, wherein the current detector is configured to calculate the first representative current and the second representative current by (1) adding up currents measured on the pixel-by-pixel basis by one of the plurality of probes and (2) dividing the resulting sum by a number of pixels.

BRIEF DESCRIPTION OF THE DRAWINGS

Example embodiments of the inventive concepts will be more clearly understood from the following detailed description taken in conjunction with the accompanying drawings in which.

DETAILED DESCRIPTION OF EXAMPLE EMBODIMENTS

Figure 1:
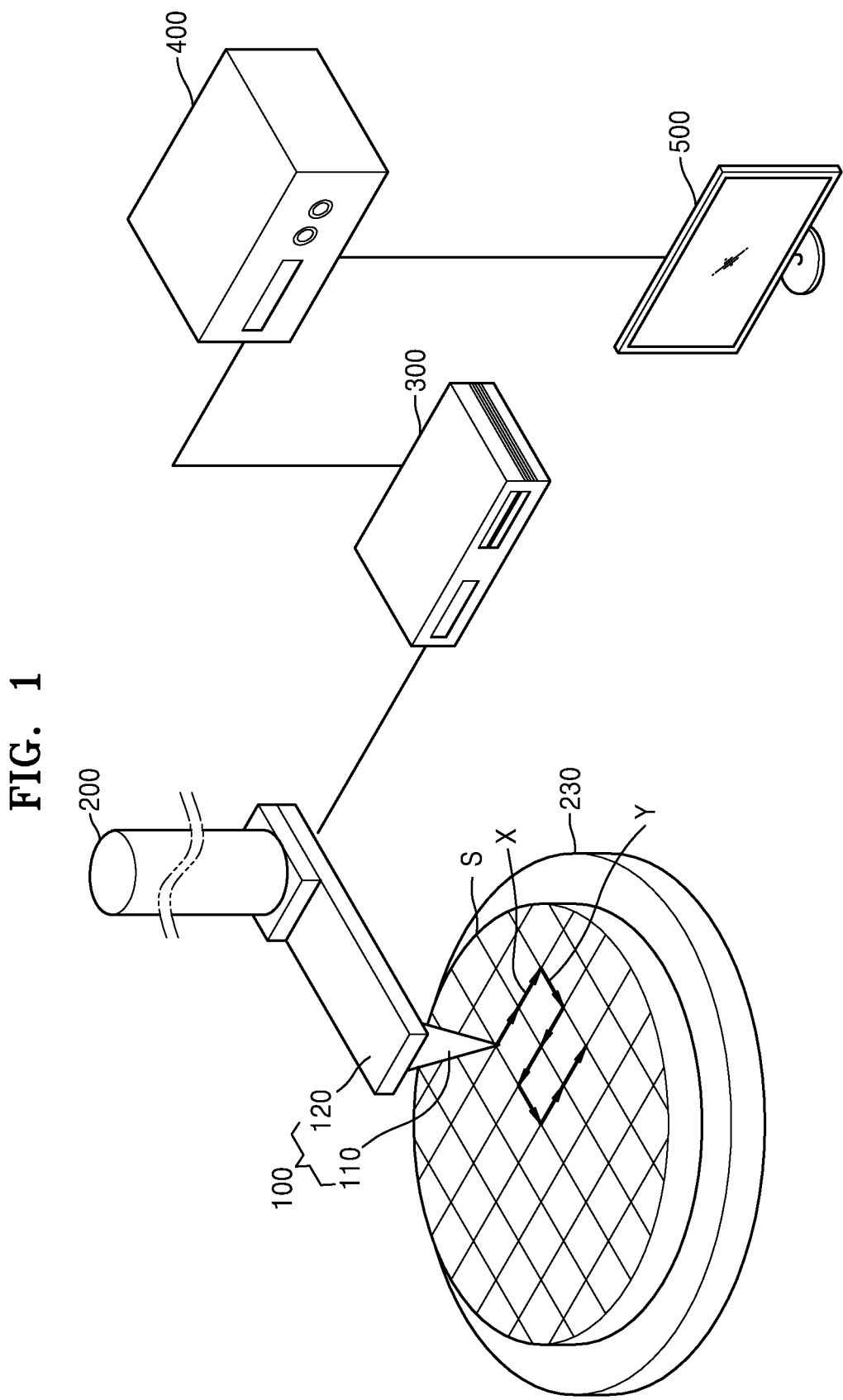
FIG. 1 is a schematic diagram of a conductive atomic force microscope according to an example embodiment of the inventive concepts.

As used herein, expressions such as "at least one of," when preceding a list of elements, modify the entire list of elements and do not modify the individual elements of the list.

Hereinafter, various example embodiments of the inventive concepts will be described in detail with reference to the accompanying drawings. However, the inventive concepts may be embodied in many different forms and should not be construed as being limited to the example embodiments set forth herein. Rather, these embodiments are provided so that this disclosure will be thorough and complete, and will fully convey the scope of the inventive concepts to those of ordinary skill in the art. In the accompanying drawings, the sizes of elements or components may be exaggerated for clarity and convenience of description.

It will be understood that when an element is referred to as being "on" another element, it may be directly on the other element or intervening elements may be present. In contrast, when an element is referred to as being "directly on" another element, there are no intervening elements present. Other terms, such as "between", describing a relation between elements may also be interpreted in the same way.

Although terms such as "first" and "second" may be used herein to describe various elements or components, these elements or components should not be limited by these terms.

These terms are only used to distinguish one element or component from another element or component. For example, a first element may be termed a second element, and, similarly, a second element may be termed a first element, without departing from the scope of the inventive concepts.

As used herein, the singular forms "a", "an", and "the" are intended to include the plural forms as well, unless the context clearly indicates otherwise. It will be understood that terms such as "comprise", "include", and "have", when used herein, specify the presence of stated features, integers, steps, operations, elements, components, or combinations thereof, but do not preclude the presence or addition of one or more other features, integers, steps, operations, elements, components, or combinations thereof.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. As used herein, the term "and/or" includes any and all combinations of one or more of the associated listed items. Expressions such as "at least one of," when preceding a list of elements, modify the entire list of elements and do not modify the individual elements of the list.

Spatially relative terms, such as "beneath," "below," "lower," "above," "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Unless otherwise defined, all terms used herein may have the same meaning as commonly understood by those of ordinary skill in the art.

Hereinafter, example embodiments of the inventive concepts will be described in detail with reference to the accompanying drawings.

FIG. 1 is a schematic diagram illustrating components of a conductive atomic force microscope 1000 according to an example embodiment of the inventive concepts.

Referring to FIG. 1, the conductive atomic force microscope 1000 may include a probe structure 100, a scanning unit 200, a current detecting unit 300, a control unit 400, and a display unit 500. The conductive atomic force microscope 1000 may further include a power supply unit.

The probe structure 100 may include a probe 110 and a cantilever 120. The probe 110 may be formed of a conductive material. The probe 110 may be a conductive probe, a surface of which is coated with a conductive material. In an example-example embodiment, the probe 110 may be formed of one selected from the group consisting of platinum (Pt), iridium (Ir), aurum (Au), ruthenium (Ru), argentum (Ag), and any alloy thereof. The probe 110 may have a size of about 100 nm or less. The cantilever 120 may be connected to the scanning unit 200 and may be vibrated at a predetermined frequency by an oscillator. When the cantilever 120 vibrates, the probe 110 may approach the surface of an object S and thus vibration amplitude or phase change may occur due to an atomic force between the two. The probe 110 may contact the surface of the object S to measure a current flowing between the object S and the probe 110. A vibration amplitude or phase change of the cantilever 120 may be measured and controlled by a position detecting unit using, for example, laser beams. Thus, the probe 110 may also measure a surface image of the object S. A bias voltage applied to the object S and detection of a current flowing between the probe 110 and the object S will be described later in detail with reference to FIG. 5.

The scanning unit 200 may move the cantilever 120 in a first direction X and a second direction Y that is perpendicular to the first direction X, according to a position signal for controlling the distance between the probe 110 and the surface of the object S mounted on a test board 230. When the cantilever 120 moves in the first direction X and the second direction Y, the probe 110 may move on the surface of the object S on a pixel-by-pixel basis and contact the surface of the object S to cause a current to flow. The scanning unit 200 may measure a current image by scanning a current flowing between the surface of the object S and the probe 110 on a pixel-by-pixel basis. The scanning unit 200 may raster-scan the surface of the object S on a pixel-by-pixel basis.

The current detecting unit 300 may measure a current flowing between the probe 110 and the surface of the object S. The current detecting unit 300 may calculate a representative current by measuring a current that is generated between the surface of the object S and the probe 110 by a bias voltage applied from the power supply unit to the object S. The current detecting unit 300 may perform an algorithm for adding up pixel-by-pixel current image values measured by the scanning unit 200 and dividing the resulting sum by the total number of pixels of the object S. The current flowing between the probe and the surface of the object S may be measured several times. Based on the measurement results, the current detecting unit 300 may calculate a representative current several times. The current detecting unit 300 may determine whether the calculated representative currents are uniform. The current detecting unit 300 may track a change trend of the representative current according to the states of the probe 110, for example, abrasion of the probe 110 and impurities deposited on the surface of the probe 110. The current detecting unit 300 will be described later in detail with reference to FIGS. 6 to 8.

The control unit 400 may include, for example, measurement equipment or an independent workstation. The control unit 400 may perform an algorithm for storing the representative current calculated by the current detecting unit 300 in a memory unit and scaling currents measured by different probe structures, based on, for example, the representative current of a sample object, the current of a measurement object, and the bias voltage. The control unit 400 may transmit information about the representative current of the sample object, the current of the measurement object, and the bias voltage to the display unit 500 in order to display the information on the display unit 500.

Figure 2:
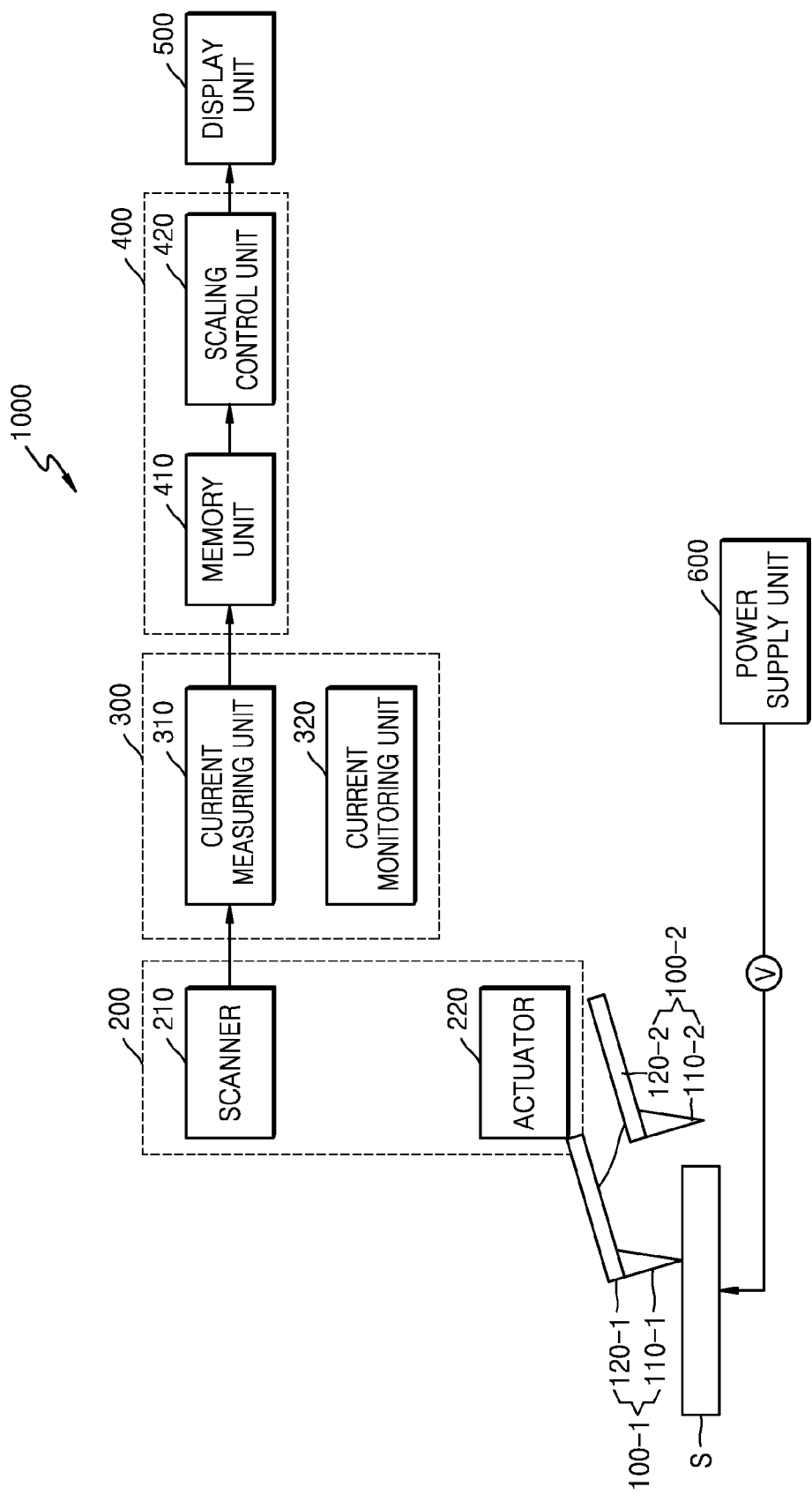
FIG. 2 is a block diagram illustrating a configuration of a conductive atomic force microscope according to an example embodiment of the inventive concepts.

The control unit 400 may include a memory unit 410 (see FIG. 2). The memory unit 410 is a medium that store data from measurement equipment or a computer. The memory unit 410 may include, for example, any one of a computer random-access memory (RAM), a hard disk, a network storage device, a flash drive, and a compact disk read-only memory (CD-ROM), but is not limited thereto. The control unit 400 may include a semiconductor chip that may perform a logical operation such as scaling of the representative current of the measurement object. For example, the control unit 400 may include at least one of a central processing unit (CPU), a controller, an application specific integrated circuit (ASIC), and an application processor (AP).

The display unit 500 may be connected to the current detecting unit 300 and/or the control unit 400 to display pieces of information that are received from the current detecting unit 300 and/or the control unit 400. The display unit 500 may include a general display device. The display unit 500 may display information about, for example, the representative current of the sample object, the current of the measurement object, and the bias voltage. The information displayed on the display unit 500 may be displayed such that values measured by different probes are classified according to the respective probes. In an example embodiment, the display unit 500 may be integrated with the control unit 400.

FIG. 2 is a block diagram illustrating components of a conductive atomic force microscope 1000 according to an example embodiment of the inventive concepts.

Referring to FIG. 2, the conductive atomic force microscope 1000 may include a first probe structure 100-1, a second probe structure 100-2, a scanning unit 200, a current detecting unit 300, a control unit 400, a display unit 500, and a power supply unit 600.

The first probe structure 100-1 and the second probe structure 100-2 may be selectively connected to the scanning unit 200. The first probe structure 100-1 may include a first probe 110-1 that contacts an object S to measure a current flowing between the surface of the object S and the first probe structure 100-1, and a first cantilever 120-1 that is connected to the first probe 110-1. Like the first probe structure 100-1, the second probe structure 100-2 may include a second probe 110-2 and a second cantilever 120-2. The first probe structure 100-1 and the second probe structure 100-2 may contact the surface of the object S and measure a current flowing on the surface of the object S. For example, when the power supply unit 600 applies a bias voltage V to the object S, a current may flow between the surface of the object S and the first probe structure 100-1. Likewise, the second probe structure 100-2 may measure a current flowing between the surface of the object S and the second probe structure 100-2. The first probe 110-1 and the second probe 110-2 may have different resistances. Thus, the current flowing between the first probe 110-1 and the surface of the object S and the current flowing between the second probe 110-2 and the surface of the object S may be different.

The scanning unit 200 may include a scanner 210 and an actuator 220. The actuator 220 may move the first or second cantilever 120-1 or 120-2 in a first direction X and a second direction Y, which is perpendicular to the first direction X, according to position signals for controlling distances between the surface of the object S and the first or second probe 110-1 or 110-2, respectively. The scanner 210 may raster-scan a current flowing between the surface of the object S and the probe 110-1/110-2 on a pixel-by-pixel basis.

The current detecting unit 300 may include a current measuring unit 310 and a current monitoring unit 320. The current measuring unit 310 may calculate a representative current by using currents of the object S measured by the scanner 210. In an example embodiment, the current measuring unit 310 may calculate a representative current by performing an algorithm for adding up currents, which are measured by scanning the surface of the object S on a pixel-by-pixel basis, and dividing the resulting sum by the number of pixels of the object S. The current flowing between the first probe 110-1 and the surface of the object S and the current flowing between the second probe 110-2 and the surface of the object S may be measured several times. Based on the measurement results, the current measuring unit 320 may calculate the representative current several times. The current monitoring unit 320 may determine whether the measured representative currents are uniform. The current monitoring unit 320 may check a change trend of the representative current to determine whether the selected probe 110-1/110-2 is defective or whether the contact resistance of the selected probe 110-1/110-2 changes. The current detecting unit 300 will be described later in detail with reference to FIG. 5.

The control unit 400 may include the memory unit 410 and a scaling control unit 420. The memory unit 410 may be connected to the current detecting unit 300 to store a first representative current that is calculated by measuring a current image of the object S by the first probe structure 100-1 and a second representative current that is calculated by measuring a current image of the object S by the second probe structure 100-2. The scaling control unit 420 may calculate a scaling factor as the ratio between the first representative current and the second representative current. In an example embodiment, the scaling control unit 420 may also calculate a scaling factor as the relative ratio between a bias voltage applied from the power supply unit 600 to the object S and the first representative current and the bias voltage and the second representative current. An algorithm for calculating the scaling factor will be described later in detail with reference to FIG. 3.

The display unit 500 may be connected to the control unit 400 to display the first representative current that is calculated by measuring the object S by the first probe structure 100-1 and the second representative current that is calculated by measuring the object S by the second probe structure 100-2. The display unit 500 may display a change trend of any one of the first representative current and the second representative current.

The power supply unit 600 may apply the bias voltage V to the object S. Thus, a current may flow between the surface of the object S and the probe 110-1/110-2, and the probe structure 100-1/100-2 may measure the current.

Figure 3:
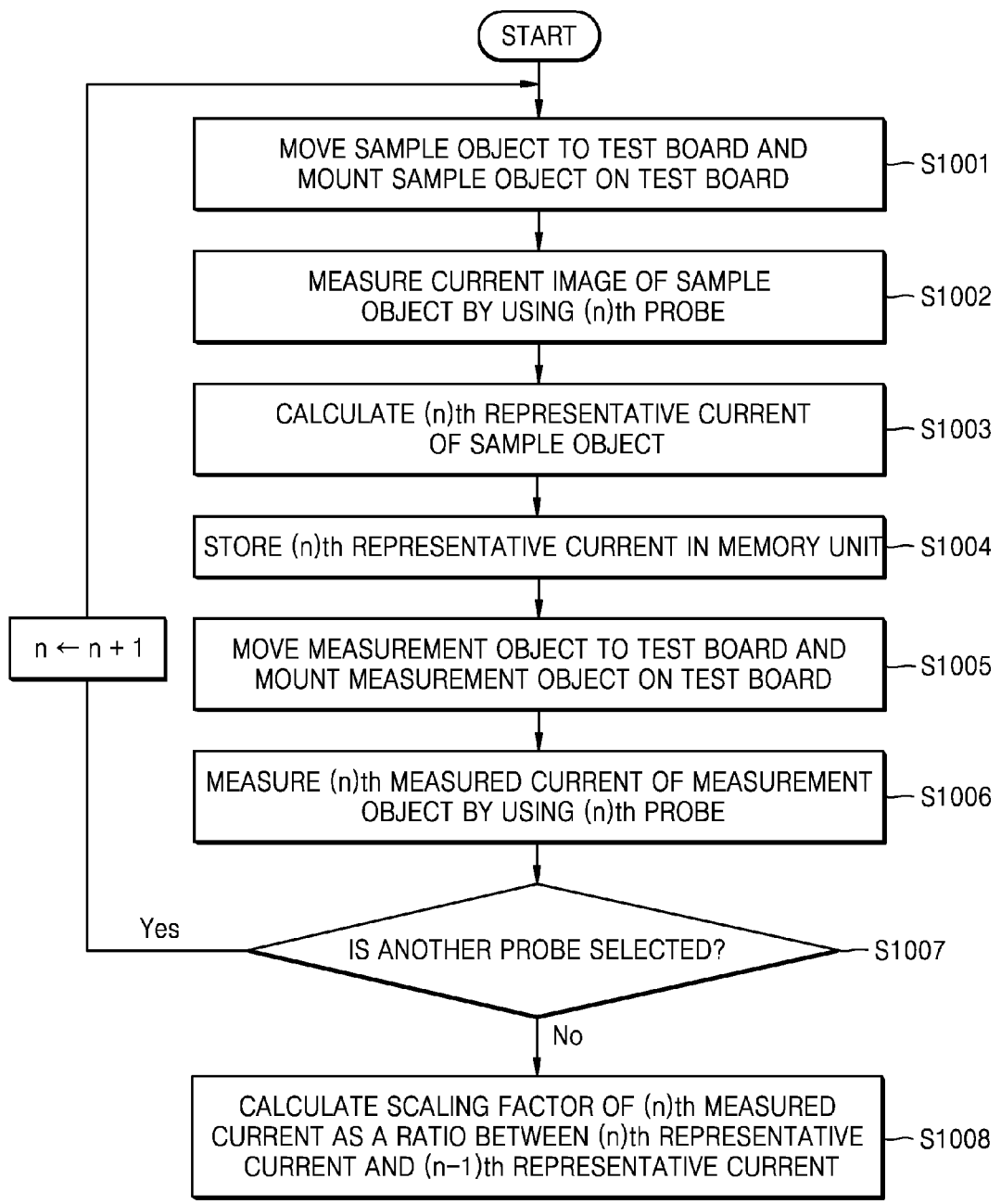
FIG. 3 is a flowchart of an operation algorithm of a conductive atomic force microscope according to an example embodiment of the inventive concepts.

FIG. 3 is a flowchart of an operation algorithm of a conductive atomic force microscope 1000 according to an example embodiment of the inventive concepts.

Referring to FIG. 3, a method of operating the conductive atomic force microscope 1000 according to an example embodiment of the inventive concepts may include operation S1001 of moving a sample object to a test board and mounting the sample object on the test board, operation S1002 of measuring a current image of the sample object by an (n)th probe, operation S1003 of calculating an (n)th representative current of the sample object by a control unit, operation S1004 of storing the (n)th representative current in a memory unit, operation S1005 of moving a measurement object to the test board and mounting the measurement object on the test board, operation S1006 of measuring an (n)th measured current of the measurement object by scanning a current image of the measurement object by the (n)th probe, operation S1007 of determining whether to select another probe, and operation S1008 of calculating a scaling factor of the (n)th measured current as a ratio between the (n)th representative current and an (n−1)th representative current. If a different probe than the (n)th probe is selected (YES) in operation S1007 of determining whether to select another probe, (n+1) may be substituted for n to repeat from operation S1001 of moving the sample object to the test board and mounting the sample object on the test board to operation S1006 of measuring the (n)th measured current of the measurement object by the (n)th probe.

In an example embodiment, the sample object may have the same surface state as the measurement object. Also, the resistance distribution of the sample object may be uniformly maintained, and the sample object may have the same resistance level as the measurement object.

Operation S1002 of measuring the current image of the sample object may be performed by scanning the surface of the sample object on a pixel-by-pixel basis by a scanning unit 200 (see FIG. 1) connected to the (n)th probe. In an example embodiment, the scanning unit 200 may raster-scan the surface of the sample object.

After operation S1002 of measuring the current image of the sample object, operation S1003 of calculating the (n)th representative current of the sample object may be performed. Operation S1003 may be performed by a current detecting unit 300 (see FIGS. 1 and 2). The current detecting unit 300 may calculate a first representative current by adding up current image values measured by scanning the surface of the sample object on a pixel-by-pixel basis and dividing the resulting sum by the total number of pixels. For example, a reference current $I_0$ may be calculated by the following equation. In the following equation, p denotes the total number of pixels of the object S.

$$I_0 = \sum_{k=1}^{p} I_k / p$$

The (n)th representative current may be stored in the memory unit 410 of the control unit 400 (see FIGS. 1 and 2) (S1004).

After operation S1004 of storing the nth representative current, the measurement object may be moved to and mounted on the test board (S1005), and the (n)th measured current may be measured by scanning the current image of the measurement object (S1006). Like the sample object, the (n)th measured current of the measurement object may be calculated by scanning the surface of the measurement object on a pixel-by-pixel basis, adding up pixel-by-pixel current image values, and dividing the resulting sum by the total number of pixels.

In an example embodiment, the (n)th representative current and the (n)th measured current measured by the (n)th probe may be displayed by the display unit 500 (see FIGS. 1 and 2).

If a different probe than the (n)th probe is selected (YES) in operation S1007 of determining whether to select another probe, (n+1) may be substituted for n to repeat from operation S1001 of moving the sample object to the test board and mounting the sample object on the test board to operation S1006 of measuring the (n)th measured current of the measurement object by the (n)th probe. For example, if n=1, when a first probe is used to calculate a first representative current and a first measured current and another probe (e.g., a second probe) is selected in operation S1007 of determining whether to select another probe, a second representative current and a second measured current may be calculated. When another probe is not selected any more, an (n−1)th representative current and an (n−1)th measured current may be fed back to calculate a scaling factor of the (n)th measured current. That is, in the above example, the first representative current and the first measured current, which are respectively the (n−1)th representative current and the (n−1)th measured current, may be fed back to calculate a scaling factor of the second measured current.

In the above example, the value of n is limited to 2, and the first probe and the second probe are described as two measurement probes. However, this is merely for convenience of description, and the inventive concepts are not limited thereto.

In the above example, a scaling factor $I_2'/I_1'$ may be calculated by the scaling control unit 420 (see FIGS. 1 and 2). When a resistance $R_0$ of the sample object and a resistance $R_x$ of the measurement object are equal to each other, the scaling factor $I_2'/I_1'$ may be equal to a ratio between the second representative current and the first representative current.

$$\frac{I_2'}{I_1'} = \frac{I_2}{I_1} \text{ for } (R_x = R_0) \tag{1}$$

However, when the resistance $R_0$ of the sample object and the resistance $R_x$ of the measurement object are different from each other, the scaling factor $I_2'/I_1'$ may be calculated by adding a ratio between the bias voltage $V_0$ applied to the sample object and the first representative current $I_1$ to a difference between the resistance $R_x$ of the measurement object and the resistance $R_0$ of the sample object and dividing the resulting sum by a value obtained by adding a ratio between the bias voltage $V_0$ applied to the sample object and the second representative current $I_2$ to the difference between the resistance $R_x$ of the measurement object and the resistance $R_0$ of the sample object.

$$\frac{I_2'}{I_1'} = \frac{R_x - R_0 + \frac{V_0}{I_1}}{R_x - R_0 + \frac{V_0}{I_2}} \text{ for } (R_x \ne R_0) \tag{2}$$

Equation (2) above may be derived from the following relational equations.

$$V_0 = (R_0 + r_1) \cdot I_1 \tag{3-1}$$

$$V_x = (R_x + r_1) \cdot I_1' \tag{3-2}$$

$$V_0 = (R_0 + r_2) \cdot I_2 \tag{4-1}$$

$$V_x = (R_x + r_2) \cdot I_2' \tag{4-2}$$

Referring to Equations (3-1) and (3-2), the first representative current $I_1$ is equal to a value obtained by dividing the bias voltage $V_0$ applied to the sample object by the sum of the resistance $R_0$ of the sample object and an internal resistance $r_1$ of the first probe, and the first measured current $I_1'$ is equal to a value obtained by dividing the bias voltage $V_x$ applied to the measurement object by the sum of the resistance $R_x$ of the measurement object and the internal resistance $r_1$ of the first probe. Referring to Equations (4-1) and (4-2), the second representative current $I_2$ is equal to a value obtained by dividing the bias voltage $V_0$ applied to the sample object by the sum of the resistance $R_0$ of the sample object and an internal resistance $r_2$ of the second probe, and the second measured current $I_2'$ is equal to a value obtained by dividing the bias voltage $V_x$ applied to the measurement object by the sum of the resistance $R_x$ of the measurement object and the internal resistance $r_2$ of the second probe.

Equation (2) may be derived by offsetting the internal resistance $r_1$ of the first probe and the internal resistance $r_2$ of the second probe by combining Equations (3-1) to (4-2). Because the internal resistance $r_1$ of the first probe and the internal resistance $r_2$ of the second probe are negligibly smaller than the resistance $R_0$ of the sample object and the resistance $R_x$ of the measurement object, when substitutions of $R_0=V_0/I_2$ and $R_x=V_x/I_2'$ are made in Equation (2), Equation (5) below may be obtained.

$$\frac{I_2'}{I_1'} = \frac{\frac{V_x}{I_2'} - \frac{V_0}{I_2} + \frac{V_0}{I_1}}{\frac{V_x}{I_2'}} \quad \text{for } (R_x \neq R_0) \tag{5}$$

Referring to Equation (5), when the resistance $R_0$ of the sample object is different from the resistance $R_x$ of the measurement object ($R_x \neq R_0$), the scaling factor $I_2'/I_1'$ of the second measured current $I_2'$ and the first measured current $I_1'$ may be calculated by adding a value obtained by dividing the bias voltage $V_0$ applied to the sample object by the first representative current $I_1$ to a difference between a value obtained by dividing the bias voltage $V_x$ applied to the measurement object by the second measured current $I_2'$ and a value obtained by dividing the bias voltage $V_0$ applied to the sample object by the second reference current $I_2$ and dividing the resulting sum by a ratio between the bias voltage $V_x$ applied to the measurement object and the second measured current $I_2'$. In this case, because the applied bias voltages $V_0$ and $V_x$, the first representative current $I_1$, the second representative current $I_2$, and the second measured current $I_2'$ are known values, the scaling factor $I_2'/I_1'$ may be calculated.

In a process of manufacturing a semiconductor device, when the conductance of the semiconductor device is to be measured or when the flow of a constant current is to be checked, a conductive atomic force microscope may be used. When a probe is replaced or a state of the probe of the conductive atomic force microscope changes, different currents may be measured through the probe. For example, even when the current of the same measurement object is measured by the first probe and the second probe, a current measured from the first probe and a current measured from the second probe may not be the same due to variables such as the bias voltage applied to the measurement object and the internal resistances of the probes. Because a conductive atomic force microscope 1000 according to an example embodiment includes the scaling control unit 420 (see FIG. 2) that scales the current values measured by different probes as described above, the conductive atomic force microscope 1000 may correct or calibrate current values measured by various probe types and/or states of the probe and produce reproducible current measurement values regardless of probe types and/or states of the probe. Thus, a more reliable current measurement is possible.

Figure 4:
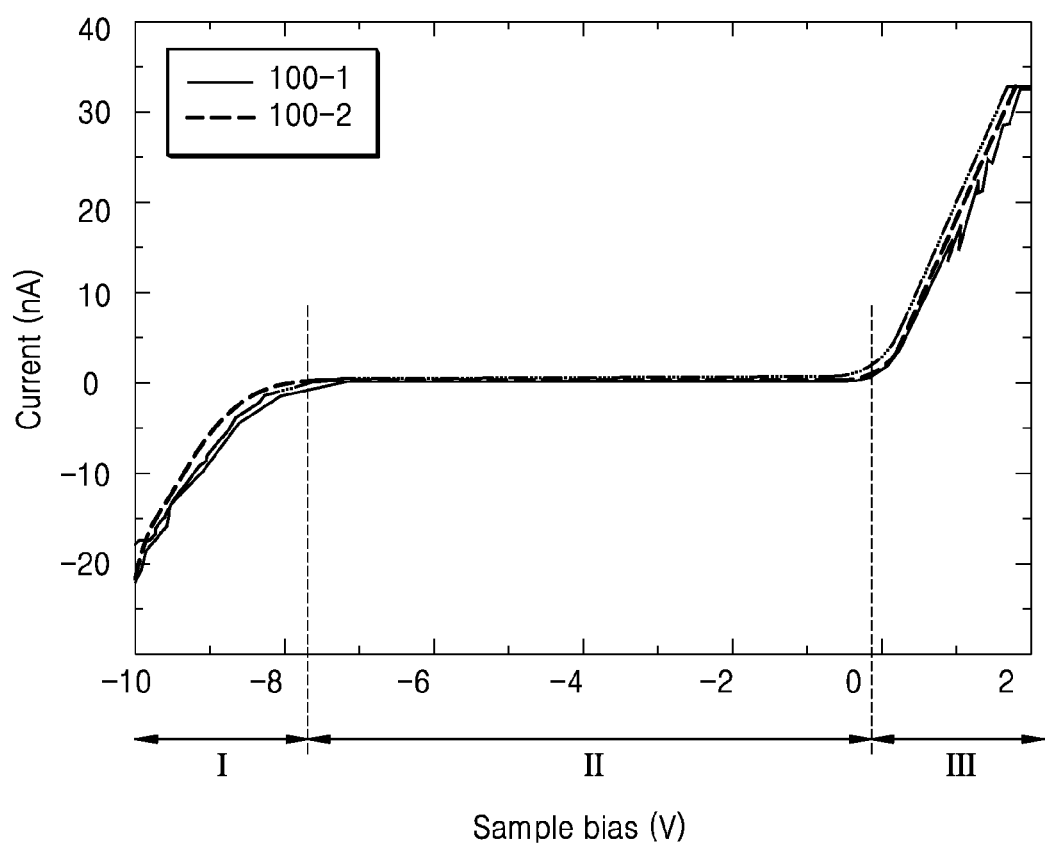
FIG. 4 is a graph illustrating a bias voltage applied by a power supply unit of a conductive atomic force microscope according to an example embodiment of the inventive concepts and currents flowing between an object and probes.

FIG. 4 is a graph illustrating a bias voltage V applied by the power supply unit 600 (see FIG. 1) of the conductive atomic force microscope 1000 according to an example embodiment of the inventive concepts and currents flowing between the object S (see FIG. 1) and the different probes 100-1 and 100-2.

Referring to FIG. 4, a relational graph of the applied bias voltage V and the current flowing between the object S and the probe 100-1/100-2 may be divided into three sections. The first section I is a reverse bias section in which the bias voltage applied from the power supply unit 600 to the object S is negative. The second section II is a nonlinear section in which a negative bias voltage is applied from the power supply unit 600 to the object S but currents flowing between the object and the probes 100-1 and 100-2 are uniform. The third section III is a linear section in which the currents flowing between the object and the probes 100-1 and 100-2 are proportional to the bias voltage V applied from the power supply unit 600 to the object S.

Operation S1008 (see FIG. 3) of calculating a scaling factor for scaling the current of the measurement object measured by the second probe structure 100-2 by feeding back the current of the measurement object measured by the first probe structure 100-1 may be performed with regard to, for example, the third section III. In an example embodiment, operation S1008 of calculating the scaling factor may be performed when the bias voltage applied to the object S is about 0.5 V or more.

Figure 5:
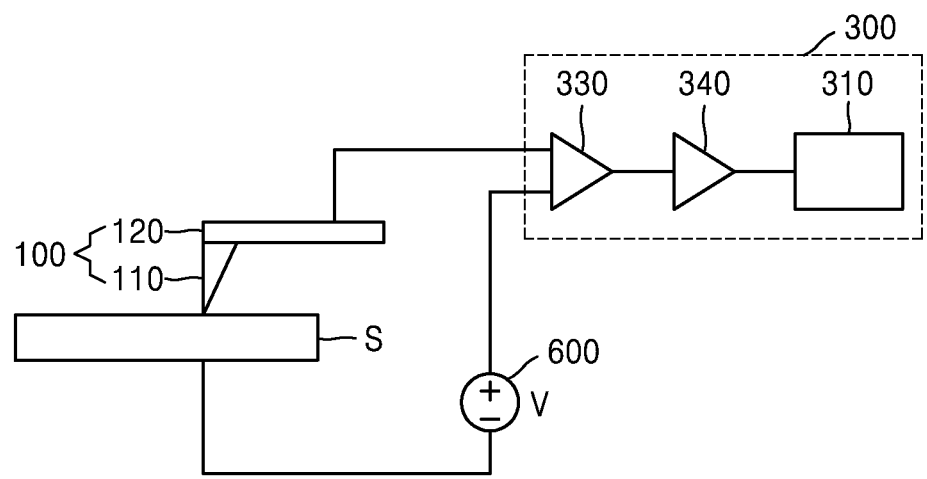
FIG. 5 is a schematic diagram illustrating a probe structure and a power supply unit of a conductive atomic force microscope according to an example embodiment of the inventive concepts.

FIG. 5 is a schematic diagram illustrating a probe structure 100, a current detecting unit 300, and a power supply unit 600 of a conductive atomic force microscope 1000 according to an example embodiment of the inventive concepts.

Referring to FIG. 5, in order to measure a representative current of a sample object S in the conductive atomic force microscope 1000, the power supply unit 600 may apply a bias voltage V to the object S. The bias voltage applied from the power supply unit 600 may cause a current to flow between the object S and a probe 110 of the probe structure 100. The current detecting unit 300 may detect a current flowing between the probe 110 and the object S through a cantilever 120 connected to the probe 110.

In an example embodiment, the current detecting unit 300 may include a filter 330, an amplifier 340, and a current measuring unit 310. A current flowing between the object S and the probe 110 may be transmitted through the cantilever 120 to the current detecting unit 300 and be detected by the current detecting unit 300. The detected current may include a noise. The filter 330 may adjust a current below a cut-off level among the detected currents to 0 A. Accordingly, it is possible to prevent or minimize an offset effect that may be caused by a noise in the measured current when the probe 110 has a size of about 100 nm or less. The amplifier 340 may amplify the current filtered by the filter 330 and transmit the amplified current to the current measuring unit 310.

Figure 6:
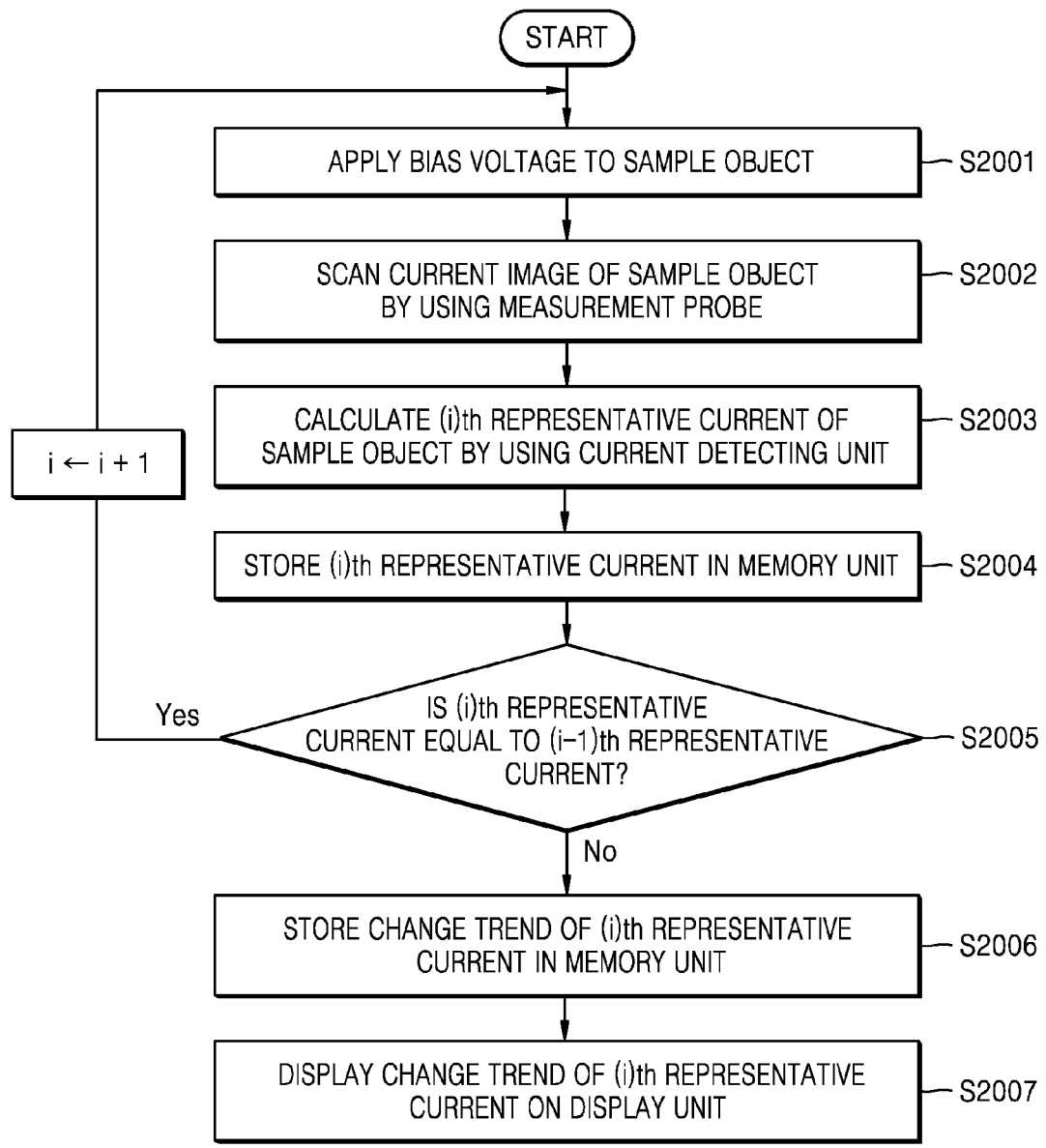
FIG. 6 is a flowchart of an operation algorithm of a conductive atomic force microscope according to an example embodiment of the inventive concepts.
Figure 7:
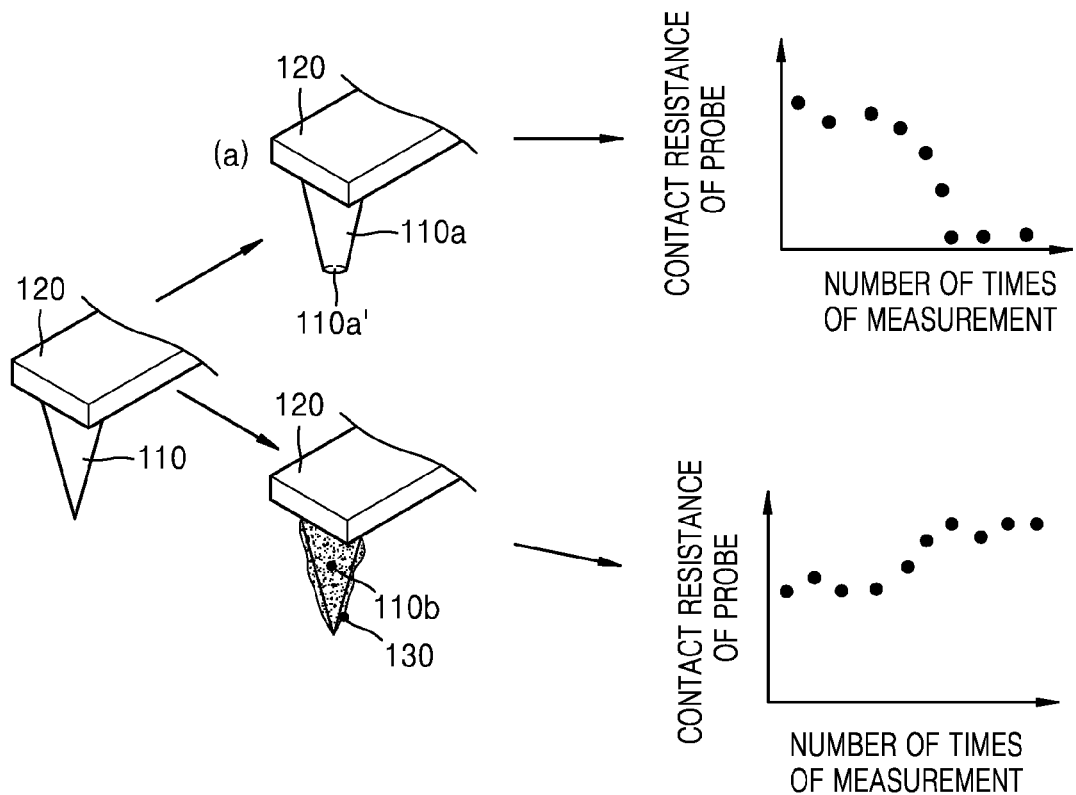
FIG. 7 is a graph illustrating contact resistances depending on the structures and states of probes of a conductive atomic force microscope according to an example embodiment of the inventive concepts.

FIG. 6 is a flowchart of an operation algorithm of the conductive atomic force microscope 1000 according to an example embodiment of the inventive concepts, for calculating a representative current and monitoring the representative current by the current monitoring unit 320.

Referring to FIG. 6, the operation algorithm may include operation S2001 of applying a bias voltage to a sample object by a power supply unit 600 (see FIG. 5), operation S2002 of scanning a current image of the sample object by using a measurement probe, operation S2003 of calculating an (i)th representative current of the sample object by a current detecting unit 300 (see FIG. 5), operation S2004 of storing the (i)th representative current in a memory unit 410 (see FIG. 2), operation S2005 of determining whether the (i)th representative current is equal to an (i−1)th representative current, operation S2006 of storing a change trend of the (i)th representative current in the memory unit 410, and operation S2007 of displaying the change trend of the (i)th representative current on a display unit. If the (i)th representative current is equal to the (i−1)th representative current in operation S2005 of determining whether the (i)th representative current is equal to the (i−1)th representative current (YES), (i+1) may be substituted for i to repeat from operation S2001 of applying the bias voltage to the sample object. For example, when i=3, a third representative current is calculated (S2003) and the third representative current is stored in the memory unit (S2004); and when the third representative current is compared with a second representative current (S2005) and is determined to be equal to the second representative current (YES), 4 is substituted for i to calculate a fourth representative current (S2003). In the above example, if the fourth representative current is different from the third representative current (NO in S2005), a change trend of the fourth representative current may be stored in the memory unit 410 (S2006) and may be displayed on a display unit 500 (see FIGS. 1 and 2) (S2007).

Operation S2002 of scanning the current image of the sample object by using the measurement probe may include an operation of raster-scanning the surface of the sample object on a pixel-by-pixel basis. Operation S2003 of calculating the representative current of the sample object by using the current detecting unit 300 (see FIG. 5) may include an operation of adding up currents measured by scanning the surface of the sample object on a pixel-by-pixel basis, and dividing the resulting sum by the total number of pixels of the sample object.

A current monitoring unit 320 (see FIG. 2) may perform operation S2005 of determining whether the (i)th representative current measured at the sample object is equal to the (i−1)th representative current. If the (i)th representative current is equal to the (i−1)th representative current, that is, when the representative currents measured several times are uniform, then the measurement may be normally performed. In such cases, the operation of measuring the representative current of the sample object may be repeated (i←i+1) in order to obtain a change trend with regard to the representative current. If the representative currents are not uniform (NO in S2005), the changed (i)th representative current may be stored in the memory unit 410 (see FIG. 2) (S2006) and the change trend of the (i)th representative current may be displayed on the display unit 500 (see FIGS. 1 and 2) (S2007). In a conductive atomic force microscope 1000 according to an example embodiment of the inventive concepts, because a probe 110 (see FIG. 5) contacts the surface of an object in order to measure the conductance or resistance of the object, the measured representative current may vary due to, for example, the abrasion of the probe 110. The conductive atomic force microscope 1000 may detect a state change of the probe 110 and a contact resistance change point of the probe 110 by performing the algorithm for calculating and monitoring the representative current as illustrated in FIG. 6. Thus, the probe 110 may be easily managed, and highly reproducible measurement results about the conductance or resistance of the object may be obtained.

FIGS. 7A and 7B are graphs illustrating contact resistances depending on the structures and states of probes of a conductive atomic force microscope according to an example embodiment of the inventive concepts.

As illustrated in FIG. 7A, a probe 110a connected to a cantilever 120 is deformed due to the physical abrasion of an object contact portion 110a'. In the conductive atomic force microscope 1000 according to an example embodiment of the inventive concepts, because the probe 110a contacts the surface of an object, the object contact portion 110a' may be abraded and thus the contact resistance of the probe 110a may change. Referring to the graph of FIG. 7A, the contact resistance of the probe 110a changes irregularly. When the object contact portion 110a' is abraded, the contact resistance of the probe 110a may be reduced. Thus, the representative current measured by the probe 110a may be measured to be greater than the original value.

An oxide layer 130 may be formed on the surface of a probe 110b illustrated in FIG. 7B. The oxide layer 130 may be deposited due to an electric field generated between an object and a lower end portion of the probe 110b. In an example embodiment, the probe 110 may be formed of a conductive metal selected from the group consisting of Pt, Ir, Au, Ru, Ag, and any alloy thereof, and the oxide layer 130 may be formed of an oxide layer of, for example, a conductive metal. Because the oxide layer 130 is a nonconductor, the contact resistance of the probe 110b may be increased. Thus, the current flowing between the probe 110b and the object may be reduced.

Figure 8:
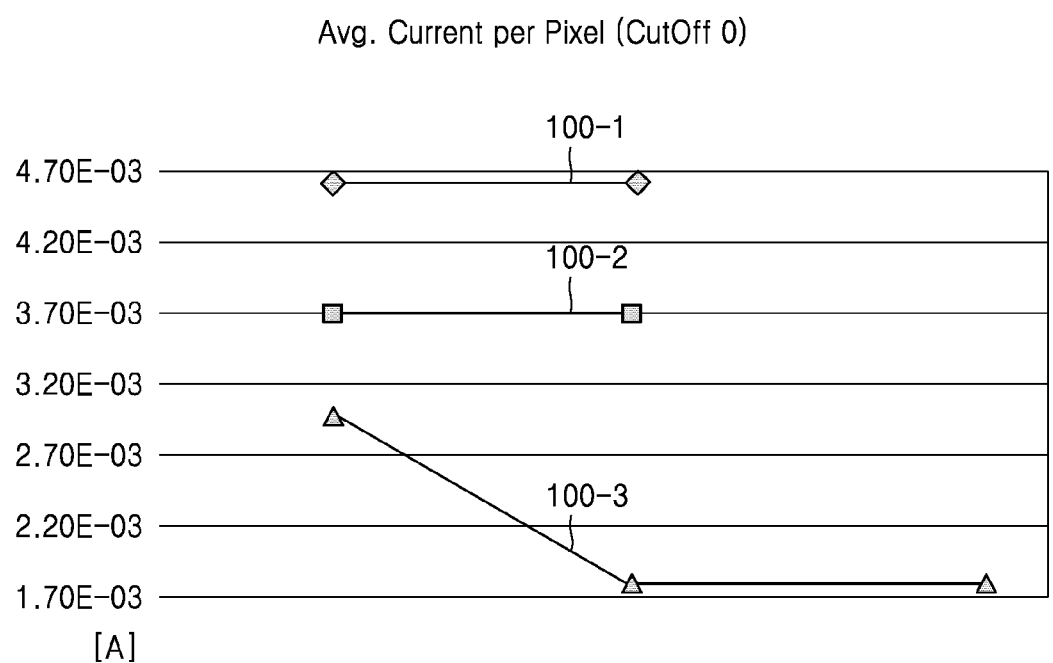
FIG. 8 is a graph illustrating measured currents of an object depending on the types of probes of a conductive atomic force microscope according to an example embodiment of the inventive concepts.

FIG. 8 is a graph illustrating measured currents of an object depending on the types of probes of first to third probe structures 100-1 to 100-3 of a conductive atomic force microscope according to an example embodiment of the inventive concepts.

Referring to FIG. 8, by performing operation S2003 of calculating the (i)th representative current of the sample object and the monitoring operation (S2005 and S2006) of determining whether the (i)th representative current is equal to the (i−1)th representative current, the representative current of the sample object may be displayed on the display unit (S2007 in FIG. 6). FIG. 8 illustrates three representative currents, including a representative current measured by the first probe structure 100-1, a representative current measured by the second probe structure 100-2, and a representative current measured by the third probe structure 100-3. However, this is merely for convenience of description, and the inventive concepts are not limited thereto. The representative current measured by the first probe structure 100-1 is uniformly maintained at a level of about $4.60\,E^{-3}$ [A], and the representative current measured by the second probe structure 100-2 is uniformly maintained at a level of about $3.70\,E^{-3}$ [A]. However, the representative current measured by the third probe structure 100-3 decreases from a level of about $2.90\,E^{-3}$ [A] to a level of about $1.70\,E^{-3}$ [A]. Because a conductive atomic force microscope 1000 according to an example embodiment of the inventive concepts detects a current by bringing a probe 110 of a probe structure 100 into contact with the surface of an object, an object contact portion of the probe 110 may be physically abraded or an oxide layer may be deposited on the surface of the probe 110. The third probe 100-3 may be physically changed like the probes 110a and 110b illustrated in FIGS. 7A and 7B. According to the inventive concepts, a state change of the probe 110 may be detected by detecting a change trend of the representative current by using the current monitoring unit 320 (see FIGS. 2 and 6), storing the change trend of the representative current in the memory unit 410 (see FIGS. 2 and 6), and displaying the change trend of the representative current on the display unit 500 (see FIGS. 2 and 6). Further, by monitoring the current measured according to the state change of the probe 110 and scaling the representative current taking into account the change trend thereof, more highly reproducible measurement results about the conductance or resistance of the object may be obtained, thereby reducing the probe dependency for current measurement.

While the inventive concepts have been particularly shown and described with reference to example embodiments thereof, it will be understood that various changes in form and details may be made therein without departing from the spirit and scope of the following claims.

What is claimed is:
1. A conductive atomic force microscope comprising:
a plurality of probe structures, each of which including a probe and a cantilever connected thereto;
a power supply unit configured to apply a bias voltage to each of a sample object and a measurement object;

a current detecting unit configured to detect a first current flowing between the sample object and each of the plurality of probe structures, detect a second current flowing between the measurement object and each of the plurality of probe structures, and calculate representative currents with respect to the sample object and the measurement object based on the first and second currents, respectively; and a control unit configured to calculate a ratio between representative currents of the sample object measured by each of the plurality of probe structures, calculate a scaling factor for scaling the representative current with respect to the measurement object measured by each of the plurality of probe structures, and determine a reproducible current measurement value based on the second current and the scaling factor.

2. The conductive atomic force microscope of claim 1, wherein when a resistance of the sample object is equal to a resistance of the measurement object, the control unit is configured to calculate the scaling factor as the ratio between the representative currents of the sample object.

3. The conductive atomic force microscope of claim 1, further comprising:
a scanning unit configured to raster-scan at least one of the sample object and the measurement object on a pixel-by-pixel basis.

4. The conductive atomic force microscope of claim 3, wherein the scanning unit comprises an actuator configured to move, on a pixel-by-pixel basis, the probe in a first direction and a second direction perpendicular to the first direction.

5. The conductive atomic force microscope of claim 2, wherein the current detecting unit is configured to calculate the representative current by (1) adding up currents measured by the probe on a pixel-by-pixel basis and (2) dividing the resulting sum by a number of pixels.

6. The conductive atomic force microscope of claim 1, further comprising:
a display unit configured to display the representative current of any one of the sample object and the measurement object.

7. The conductive atomic force microscope of claim 1, wherein the current detecting unit comprises a current monitoring unit configured to check whether representative currents measured at the measurement object are uniform.

8. The conductive atomic force microscope of claim 1, wherein the control unit comprises a memory unit configured to store the representative current of each of the sample object and the measurement object measured by each of the plurality of probe structures.

9. A method of operating a conductive atomic force microscope, the method comprising:
selecting a first probe as a measurement probe;
applying a bias voltage to a sample object and measuring a first current image using the first probe;
calculating a first representative current based on the first current image using a current detecting unit;
applying a bias voltage to a measurement object and measuring a first measured current using the first probe;
selecting a second probe as a measurement probe;
applying a bias voltage to the sample object and measuring a second current image using the second probe;
calculating a second representative current based on the second current image of the sample object using the current detecting unit;
applying a bias voltage to the measurement object and measuring a second measured current using the second probe;

calculating a scaling factor by feeding back the first representative current and the applied first and second bias voltages and dividing the second representative current by the first representative current; and determining a reproducible current measurement value based on the first and second measured currents and the scaling factor.

10. The method of claim 9, further comprising:
measuring the conductance and resistance of the measurement object based on the scaling factor.

11. The method of claim 9, wherein the calculating a scaling factor is performed for a range, in which the current measured by each of the first probe and the second probe is linear with respect to the bias voltages.

12. The method of claim 9, further comprising:
calculating a resistance of the sample object by dividing the bias voltage applied to the sample object by the second representative current; and
calculating a resistance of the measurement object by dividing the bias voltage applied to the measurement object by the second measured current,
wherein when the resistance of the sample object is different from a resistance of the measurement object, the calculating a scaling factor is performed by adding a value, which is obtained by dividing the bias voltage applied to the sample object by the first representative current, to a difference between the resistance of the measurement object and the resistance of the sample object, and dividing the resulting sum by a value obtained by adding a value, which is obtained by dividing the bias voltage applied to the sample object by the second representative current, to the difference between the resistance of the measurement object and the resistance of the sample object.

13. The method of claim 9, further comprising:
displaying the first measured current and the second measured current on a display unit.

14. The method of claim 9, wherein the calculating the first current image and the calculating the second current image are performed by scanning the sample object on a pixel-by-pixel basis using the first probe and the second probe, respectively.

15. The method of claim 12, wherein the calculating each of the first representative current and the second representative current is performed by adding up current image values measured by scanning the sample object on a pixel-by-pixel basis and dividing the resulting sum by a number of pixels.

16. A conductive atomic force microscope comprising:
a power supply configured to apply a first bias voltage to a sample object and a second bias voltage to a measurement object;
a plurality of probe structures configured to measure a first sample current flowing through the sample object and one of the plurality of probe structures, measure a second sample current flowing through the sample object and another of the plurality of probe structure, measure a first measurement current flowing between a measurement object and one of the plurality of probe structures, and measure a second measurement current flowing between a measurement object and another of the plurality of probe structures;
a current detector configured to calculate a first representative current and a second representative current based on the first sample current and the second sample current, respectively; and
a controller configured to calculate a scaling factor for the second measured current, and determine a reproducible current measurement value based on the second measurement current and the scaling factor.

17. The conductive atomic force microscope of claim 16, wherein when a resistance of the sample object is equal to a resistance of the measurement object, the controller is configured to calculate the scaling factor for the second measurement current as a ratio between the first and second representative currents of the sample object.

18. The conductive atomic force microscope of claim 16, wherein when a resistance of the sample object and a resistance of the measurement object are different from each other, the controller is configured to calculate the scaling factor for the second measurement current based on the first and second bias voltages, the first representative current, the second representative current, and the second measured current.

19. The conductive atomic force microscope of claim 16, wherein the current detector is further configured to track a change trend of the first and second representative currents according to states of the plurality of probes by checking whether the first and second representative currents are uniform.

20. The conductive atomic force microscope of claim 16, further comprising:
- a scanner configured to raster-scan the sample object and the measurement object on a pixel-by-pixel basis,
- wherein the current detector is configured to calculate the first representative current and the second representative current by (1) adding up currents measured on the pixel-by-pixel basis by one of the plurality of probes and (2) dividing the resulting sum by a number of pixels.

\* \* \* \* \*